(12) United States Patent
Shah et al.

(10) Patent No.: US 10,248,805 B2
(45) Date of Patent: Apr. 2, 2019

(54) DATABASE SECURITY TOOL

(71) Applicant: BANK OF AMERICA CORPORATION, Charlotte, NC (US)

(72) Inventors: Mitul S. Shah, Mumbai (IN); Ruchi R. Jain, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 382 days.

(21) Appl. No.: 15/153,793

(22) Filed: May 13, 2016

(65) Prior Publication Data

US 2017/0329987 A1 Nov. 16, 2017

(51) Int. Cl.
*G06F 21/60* (2013.01)
*G06F 21/62* (2013.01)

(52) U.S. Cl.
CPC ........ *G06F 21/6218* (2013.01); *G06F 21/604* (2013.01)

(58) Field of Classification Search
CPC ............................ G06F 21/604; G06F 21/6218
USPC .......................................................... 726/28
See application file for complete search history.

(56) References Cited

U.S. PATENT DOCUMENTS

2003/0105732 A1* 6/2003 Kagalwala ........ G06F 17/30292
2004/0044655 A1* 3/2004 Cotner ................ G06F 21/6227
2011/0106681 A1* 5/2011 Cockerell .............. G06Q 10/06 705/35
2013/0347125 A1* 12/2013 Rezlan ................ H04L 63/1408 726/27

OTHER PUBLICATIONS

How do I . . . Enforce domain integrity for SQL Server data using CHECK constraints? Susan Harkins Mar. 5, 2007 https://www.techrepublic.com/article/how-do-i-enforce-domain-integrity-for-sql-server-data-using-check-constraints/ (Year: 2007).*
A beginner's guide to SQL Server transaction logs Ivan Stankovic Feb. 11, 2014 https://www.sqlshack.com/beginners-guide-sql-server-transaction-logs/ (Year: 2014).*

* cited by examiner

*Primary Examiner* — Kambiz Zand
*Assistant Examiner* — Benjamin A Kaplan
(74) *Attorney, Agent, or Firm* — Baker Botts L.L.P.

(57) ABSTRACT

A database security tool includes a user interface, a retrieval engine, an authorization engine, an alert engine, and an update engine. The user interface receives a request to add a row to a table in a database. The retrieval engine retrieves an authorization table from the database. The authorization table is separate from the table and indicates a plurality of users who are authorized to edit the table. The authorization engine determines whether the plurality of users includes the user. The alert engine communicates an alert indicating that the user is not authorized to add the row to the table. The update engine communicates, to the database, an update request in response to a determination that the plurality of users includes the user. The row is added to the table in response to the update request.

15 Claims, 7 Drawing Sheets

DATABASE SECURITY TOOL

TECHNICAL FIELD

This disclosure relates generally to a tool for securing a database.

BACKGROUND

Databases store an ever increasing amount of data. When unauthorized users edit a database, that database can become noncompliant and/or unusable.

SUMMARY OF THE DISCLOSURE

According to an embodiment, a database security tool includes a user interface, a retrieval engine, an authorization engine, an alert engine, and an update engine. The user interface receives a request from a user to add a row to a table in a database. The retrieval engine retrieves, in response to the request, an authorization table from the database. The authorization table is separate from the table and indicates a plurality of users who are authorized to edit the table. The authorization engine determines whether the plurality of users includes the user. The alert engine communicates an alert in response to a determination that the plurality of users does not include the user. The alert indicates that the user is not authorized to add the row to the table. The update engine communicates, to the database, an update request in response to a determination that the plurality of users includes the user. The row is added to the table in response to the update request.

According to another embodiment, a method includes receiving a request from a user to add a row to a table in a database and retrieving, in response to the request, an authorization table from the database. The authorization table is separate from the table and indicates a plurality of users who are authorized to edit the table. The method also includes determining whether the plurality of users includes the user and communicating an alert in response to a determination that the plurality of users does not include the user. The alert indicates that the user is not authorized to add the row to the table. The method further includes communicating, to the database, an update request in response to a determination that the plurality of users includes the user. The row is added to the table in response to the update request.

According to yet another embodiment, a system includes a retrieval engine, an authorization engine, an alert engine, and an update engine. The retrieval engine retrieves, in response to a received request to add a row to a table in a database, an authorization table from the database. The authorization table is separate from the table and indicates a plurality of users who are authorized to edit the table. The authorization engine determines whether the plurality of users includes the user. The alert engine communicates an alert in response to a determination that the plurality of users does not include the user. The alert indicates that the user is not authorized to add the row to the table. The update engine communicates, to the database, an update request in response to a determination that the plurality of users includes the user. The row is added to the table in response to the update request.

Certain embodiments provide one or more technical advantages. For example, an embodiment improves the operation of a database by ensuring that unauthorized users do not render the database unusable. As another example, an embodiment improves the operation of the database by ensuring that unauthorized users do not edit the database. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 7 of the drawings, like numerals being used for like and corresponding parts of the various drawings.

As networks and services grow more ubiquitous and complex, the need for data storage continues to increase. As a result, more and more databases are added to existing services. The amount of data stored in databases also increases leading to an increase in data load. As the data load increases, it becomes more challenging to maintain and secure that data. For example, a table in a database may include over 100 columns, with each column storing data of a particular datatype. When a row is to be added to that table, it becomes challenging for a user to remember what types of data should be kept in which columns and the ordering of those columns. Additionally, when multiple rows or an entire table needs to be added to the database, the user faces the additional challenge of generating multiple queries and/or operations against the database to perform these bulk operations, thereby increasing the chance for mistakes and errors.

If a user provides appropriate data such as, for example, data of an incorrect datatype to be added to a table, then that table and/or the entire database could become corrupted. For example, if a column of a table is supposed to store a numerical value and a user adds a row and accidentally includes a text value in that column, the table becomes corrupted. As a result, the table and/or the database may become unusable until the inappropriate data is corrected. When bulk operations, such as the addition of multiple rows or an entire table, need to be performed, it becomes easier for the user to make a mistake and add inappropriate data to the database. It is therefore important and challenging to maintain the data compliance.

Moreover, as the number of users grows it becomes more difficult to maintain the security of the database. For example, a user may accidentally edit a table in the database when the user does not understand the types of data stored in that table. As a result, the table and/or the database may become corrupted. Therefore, it is important for users who understand the structure and layout of the database to be given permission to edit the database and for users who do not understand the structure and layout of the database to be prevented from editing the database.

This disclosure contemplates a database service tool that maintains database security and data compliance. For example, the database service tool maintains an authorization table that indicates the users who are authorized to edit certain tables in the database. Before any edits are made to a table, the database service tool checks the authorization table to determine whether a user is authorized to edit that table. If the user is authorized to edit the table, the database service tool allows the user to edit the table. Otherwise, the database service tool prevents the user from editing the table. As another example, the database service tool determines the datatype(s) for each column of a table. The database service tool then provides values of those datatypes from which a user can select. In this manner, the user is limited in the values that the user can select to edit the table. As a result, the database service tool prevents the user from adding inappropriate data to the database. As yet another example, the database service tool can perform bulk operations such as the addition of multiple rows and/or a table to the database. The database service tool can automatically generate the necessary queries to perform the bulk operations.

By using the database service tool, the security of a database is improved by ensuring that only users who are authorized to edit a table are given permission to edit the table in certain embodiments. In some embodiments, the database service tool improves the operation of the database by ensuring that the tables of the database include data of a suitable datatype. In some embodiments, the database service tool improves the process of editing and/or updating the database by automatically generating queries to perform bulk operations. The database service tool will be described generally using FIG. 1. The database service tool will be described in more detail using FIGS. 2 through 7.

Figure 1:
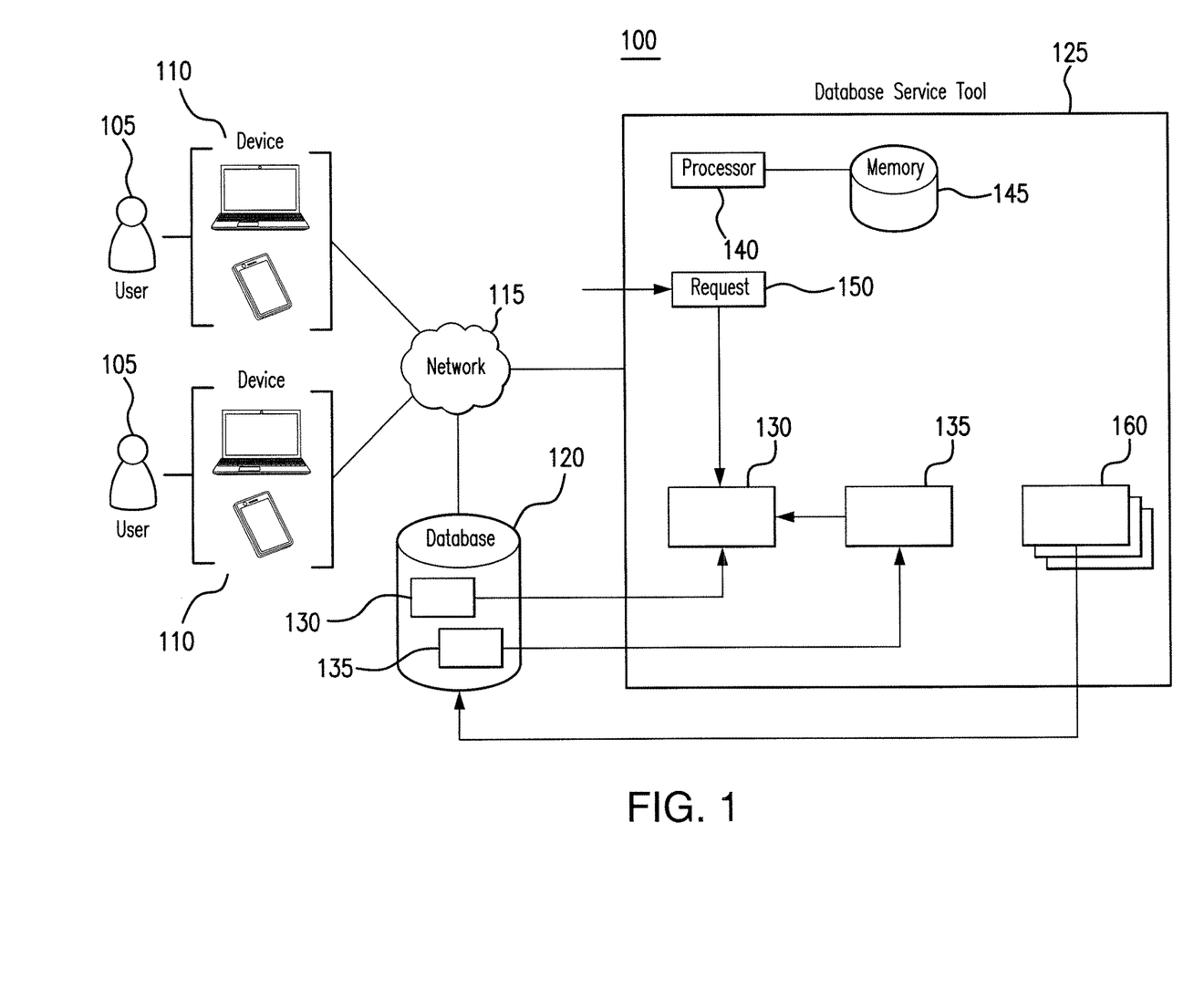
FIG. 1 illustrates a system for servicing a database.

FIG. 1 illustrates a system 100 for servicing a database. As illustrated in FIG. 1, system 100 includes one or more devices 110, a network 115, a database 120, and a database service tool 125. In particular embodiments, database service tool 125 improves the security and data compliance of database 120.

Device 110 is any device capable of communicating with other components of system 100 over network 115. For example, device 110 may be used by a user 105 to edit data stored in database 120. Device 110 may provide a user interface through which user 105 can interact with database service tool 125 and/or database 120. In some embodiments, the user interface may be provided by database service tool 125.

This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 120 stores data used by system 100. Database 120 may store that data in one or more tables 130. Each table 130 may include one or more columns. Each column may store data of a particular datatype. For example, a column labeled income may store numerical values representative of various incomes. As another example, a column named usernames may store strings representative of usernames. This disclosure contemplates tables 130 and/or database 120 storing data of any datatype.

Users 105 may use devices 110 to access, edit, and/or view data stored in database 120. For example, users 105 may use devices 110 to retrieve data stored in database 120 so that the data can be viewed on devices 110. As another example, users 105 may use devices 110 to submit edits to database 120 to edit data within table 130.

Several issues occur when the number of users 105 and/or the size of table 130 grows. For example, as the number of users grows, it becomes more difficult to maintain the security of database 120. Certain users may have an understanding of table 130 and/or database 120 and, as a result, can make appropriate edits to database 120. On the other hand, some users may have very little understanding of table 130 and/or database 120 and, as a result, are prone to make mistakes when editing database 120. As another example, as the size of table 130 grows to include more and more columns, it becomes more challenging to edit table 130 without introducing inappropriate data into table 130. Specifically, the ordering of the columns may become more difficult to remember and, as a result, when adding a row to table 130, the request to add the row may include data that is out of order and/or data that is of an inappropriate datatype for the particular column of table 130. As yet another example, it may be difficult for a user to perform bulk operations on database 120 when the bulk operations involve several smaller operations. For example, if a user attempts to add an entire table to database 120, the user may be required to input a separate query to add each row of the table to database 120. As the number of queries increases it becomes more likely that the user will make a mistake.

Database service tool 125 addresses these and other issues in certain embodiments. As illustrated in FIG. 1, database service tool 125 includes a processor 140 and a memory 145. This disclosure contemplates processor 140 and memory 145 being configured to perform any of the functions of database service tool 125 described herein.

Processor 140 is any electronic circuitry, including, but not limited to microprocessors, application specific integrated circuits (ASIC), application specific instruction set processor (ASIP), and/or state machines, that communicatively couples to memory 145 and controls the operation of database service tool 125. Processor 140 may be 8-bit, 16-bit, 32-bit, 64-bit or of any other suitable architecture. Processor 140 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 140 may include other hardware and software that operates to control and process information. Processor 140 executes software stored on memory to perform any of the functions described herein. Processor 140 controls the operation and administration of database service tool 130 by processing information received from network 115, device(s) 110, and memory 145. Processor 140 may be a programmable logic device, a microcontroller, a microprocessor, any suitable processing device, or any suitable combination of the preceding. Processor 140 is not limited to a single processing device and may encompass multiple processing devices.

Memory 145 may store, either permanently or temporarily, data, operational software, or other information for processor 140. Memory 145 may include any one or a combination of volatile or non-volatile local or remote devices suitable for storing information. For example, memory 145 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 145, a disk, a CD, or a flash drive. In particular embodiments, the software may include an application executable by processor 140 to perform one or more of the functions described herein.

Database service tool 125 may be used to maintain data compliance in database 120. For example, database service tool 125 may ensure that each column of table 130 stores the appropriate datatype for that column in some embodiments. Database service tool 125 receives a request 150. Request 150 may indicate an operation to be performed on database 120. In some embodiments, user 105 may provide request 150 to database service tool 125 through device 110 and/or through a user interface provided by database service tool 125. As an exemplary embodiment, request 150 may indicate a row to be added to table 130. This disclosure contemplates request 150 indicating any operation to be performed on database 120. In response to receiving request 150, database service tool 125 may retrieve table 130 from database 120. Database service tool 125 may determine a datatype for each column of table 130. These datatypes may indicate the types of values stored in those columns. For example, a column storing numerical values may be associated with a datatype for a number. As another example, a column storing text may be associated with a datatype for text. Database service tool 125 may then determine appropriate values for each column of table 130 and present those values as options to user 105 for selection. User 105 may then select the values to be added for the row. After the selections are made, database service tool 125 may add the row with the selected values to table 130. In this manner, database service tool 125 may limit the values that can be added to each column of table 130 to ensure that each column of table 130 includes values of the appropriate datatype for that column. This process of maintaining data compliance will be described in more detail using FIGS. 2 and 3.

Database service tool 125 may also improve the security of database 120 by determining whether a user 105 is authorized to perform an operation on database 120 before that user 105 performs the operation. Database 120 may store an authorization table 135 that indicates which users 105 are authorized to perform certain operations on database 120. For example, authorization table 135 may indicate which users 105 are allowed to edit table 130. As another example, authorization table 135 may indicate which users are authorized to view table 130. This disclosure contemplates authorization table 135 indicating any type of privilege with respect to database 120 and/or table 130. This disclosure also contemplates database 120 storing any number of authorization tables 135. For example, database 120 may store an authorization table 135 per table 130 stored in database 120. As another example, database 120 may store an authorization table 135 per user 105.

Database service tool 125 may analyze authorization table 135 to see whether the requesting user 105 is authorized to edit table 130 such as, for example, by adding a row to table 130. For example, database service tool 125 may check to see if the requesting user is listed in authorization table 135. As another example, database service tool 125 may check to see if the requesting user is granted the privilege of editing table 130 as indicated by authorization table 135. If the requesting user 105 is authorized to edit table 130, database service tool 125 may perform the requested operation in request 150 such as, for example, adding a row to table 130. If the requesting user 105 is not authorized to edit table 130, then database service tool 125 may prevent that user 105 from editing table 130. In this manner, database service tool 125 maintains the security of database 120 by allowing only operations from authorized users 105 to be performed on database 120. This process of determining if a user 105 is authorized to perform an operation will be described in more detail using FIGS. 4 and 5.

Database service tool 125 may also perform bulk operations on database 120. For example, a user 105 may request in request 150 to add a table to database 120 and/or multiple rows to table 130. In response, database service tool 125 may generate multiple queries 160 and send those queries 160 to database 120. For example, if a user 105 wants to add multiple rows to table 130, database service tool 125 may generate multiple queries 160, each query 160 adding a single row to table 130. As another example, if user 105 wants to add a table to database 120 database service tool 125 may generate a query 160 to create a new table in database 120. Then database service tool 125 may generate multiple queries 160 to add rows to the newly created table. For example, each row may be added using a query 160. In this manner, database service tool 125 may reduce the chance that user 105 will make a mistake in performing the bulk operations. For example, database service tool 125 may generate automatically multiple queries 160 rather than having user 105 generate each query 160 individually. This process of performing bulk operations will be described in more detail using FIGS. 6 through 7.

Figure 2:
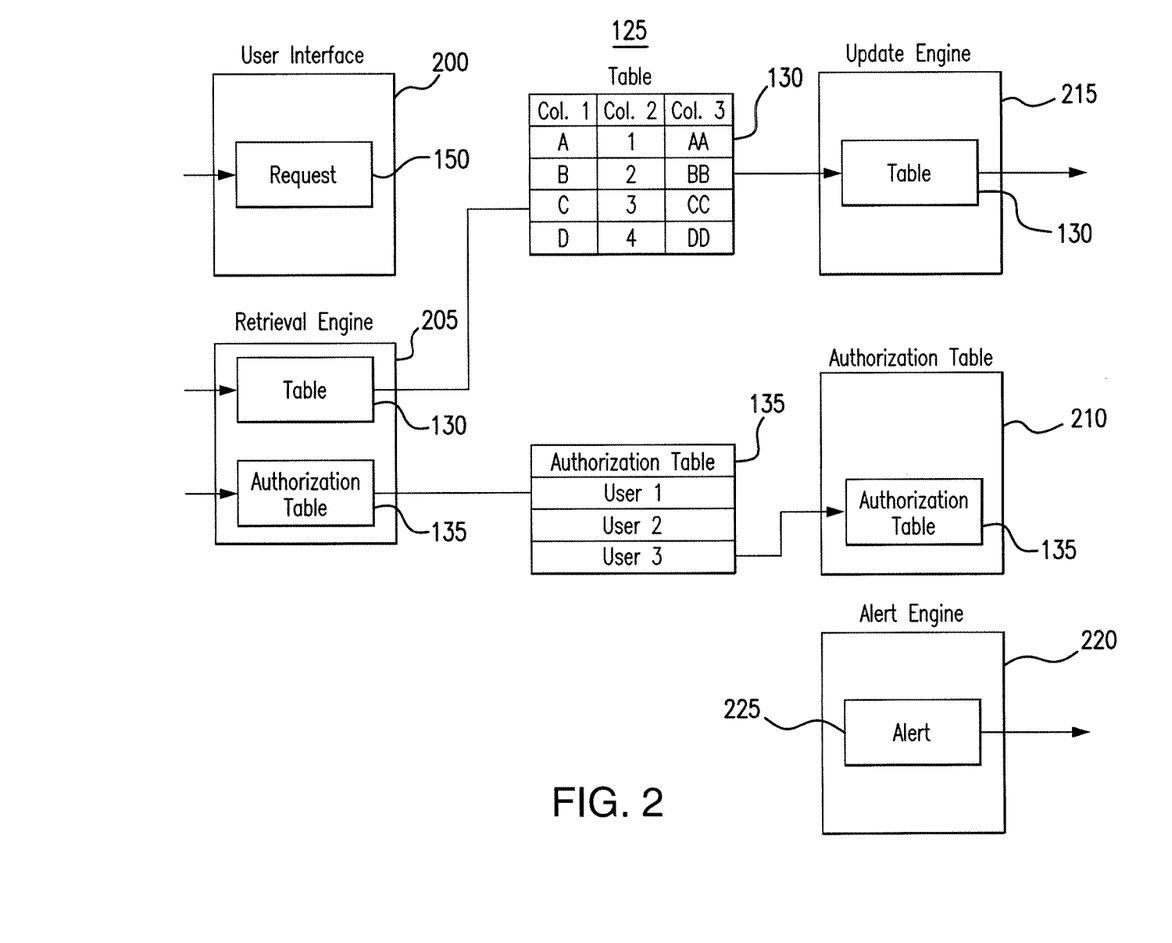
FIG. 2 illustrates the database service tool of the system of FIG. 1 enforcing database security.
Figure 3:
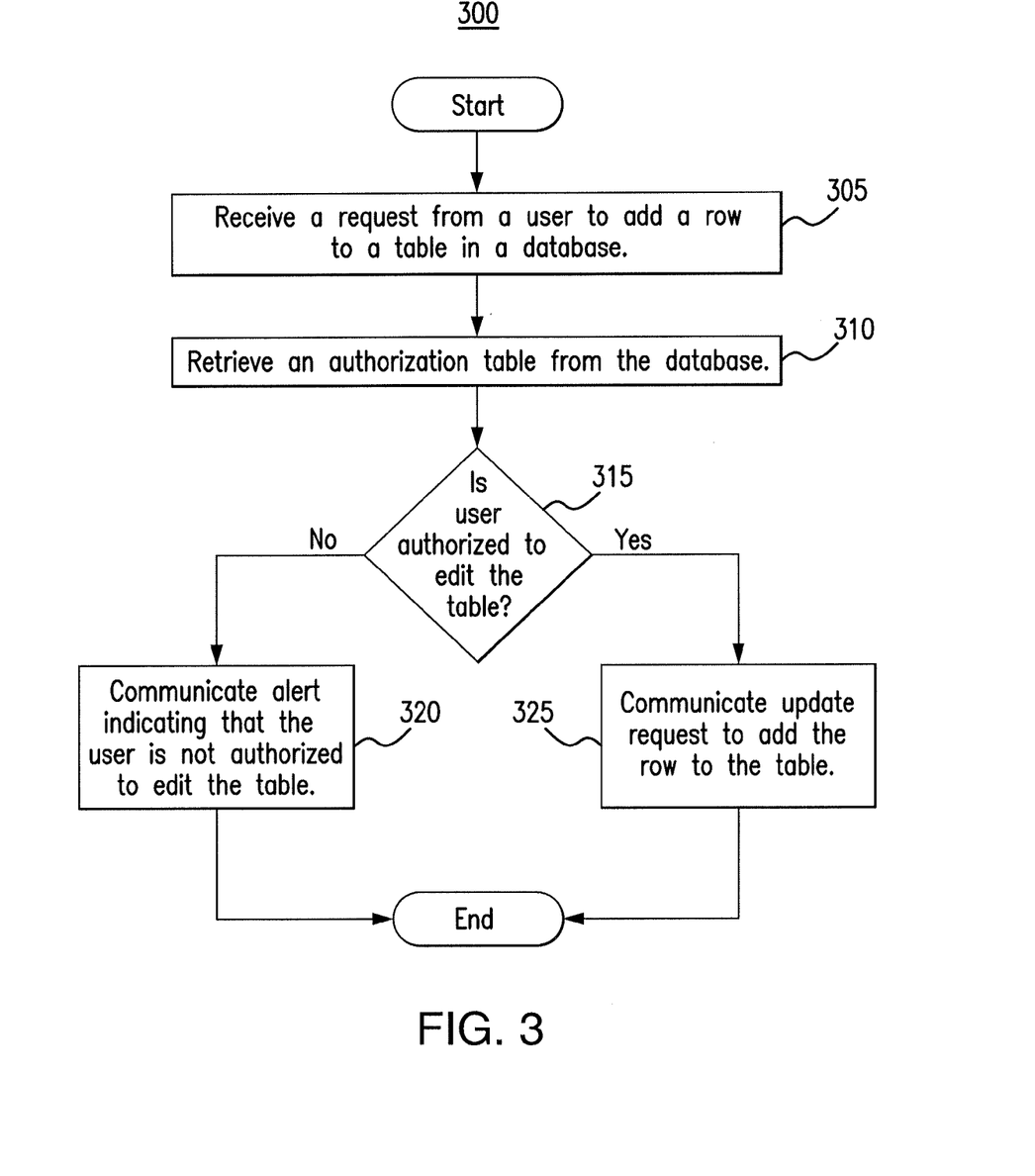
FIG. 3 is a flowchart illustrating a method for enforcing database security using the system of FIG. 1.

FIGS. 2 and 3 show database service tool 125 enforcing database security. Generally, database service tool 125 enforces database security by ensuring that a user is authorized to perform an operation before allowing that operation to proceed. Database service tool 125 may determine whether a user is authorized to perform the operation by checking an authorization table stored in the database.

FIG. 2 illustrates the database service tool 125 of the system 100 of FIG. 1 enforcing database security. As illustrated in FIG. 2, database service tool 125 includes a user interface 200, a retrieval engine 205, an authorization engine 210, an update engine 215 and an alert engine 220. In some embodiments, database service tool 125 is also referred to as a database security tool. In particular embodiments, by using database service tool 125 the security of a database may be improved by ensuring that only users who are authorized to perform operations on the database actually perform operations on the database.

User interface 200 may be configured to receive user input and to present information to the user. This disclosure contemplates user interface 200 being presented on database service tool 125 and/or another device 110 of system 100. This disclosure contemplates database service tool 125 presenting user interface 200 on another device 110. In one embodiment, user interface 200 receives a request 150 to perform an operation on a database. Request 150 may include a request to edit a table 130 stored in the database. Database service tool 125 may check whether a user who issued request 150 is authorized to perform the requested operation before performing the operation. An example algorithm followed by user interface 200 is as follows: present information to user, wait for input from the user; and receive input such as, for example, request 150 from the user.

In response to user interface 200 receiving request 150, retrieval engine 205 may retrieve information from the database to determine whether the user is authorized to perform the requested operation. Retrieval engine 205 may retrieve an authorization table 135, separate from table 130, from the database. Authorization table 135 may indicate the users who are authorized to perform certain operations. This disclosure contemplates the database storing any number of authorization tables 135. For example, the database may store authorization tables 135 at a table level such that there is one authorization table 135 per table 130 stored in the database. Each authorization table 135 indicates the users who are authorized to perform an operation on that table. As another example, the database may store one authorization table 135 that indicates the users who are authorized to perform operations on the database. As yet another example, the database may store authorization tables 135 at the user level. Each authorization table 135 may indicate the operations that a particular user is authorized to perform. In the illustrated example of FIG. 2, authorization table 135 indicates that user 1, user 2 and user 3 are authorized to perform operations on the database and/or table 130.

Retrieval engine 205 may retrieve table 130 from the database so that operations can be performed on table 130. In the illustrated example of FIG. 2, table 130 includes three columns: column 1 stores a letter, column 2 stores a number and column 3 stores a string of characters.

An example algorithm followed by retrieval engine 205 is as follows: receive an indication from user interface 200 indicating that request 150 has been received; open a connection with a database in response to receiving request 150; retrieve authorization table 135 over the connection; and retrieve table 130 over the connection.

Authorization engine 210 analyzes authorization table 135 to determine whether a user who sent request 150 is authorized to perform the requested operation. If the user is authorized to perform the requested operation, authorization engine 210 may allow the operation to proceed. If the user is not authorized to perform the operation, authorization engine 210 prevents the operation from proceeding. An example algorithm for authorization engine 210 is as follows: receive authorization table 135; determine a user who issued request 150; analyze authorization table 135 to determine whether the user is listed in authorization table 135; if the user is listed in authorization table 135, allow the requested operation to proceed; and if the user is not listed in authorization table 135, prevent the operation from proceeding.

Update engine 215 performs a requested operation in response to receiving an indication from authorization engine 210 that the requesting user is authorized to perform the operation. Update engine 215 may perform the requested operation on table 130 and communicate the updated table back to the database. In particular embodiments, update engine 215 may generate and communicate a query to the database, and the database performs the requested operation on table 130 in response to receiving the query. For example, if the user requested that a row be added to table 130, update engine 215 may add the row to table 130 and then communicate the updated table to the database. Update engine 215 may alternatively generate a query and/or an update request to add a row to table 130. Update engine 215 may then communicate that query to the database and in response to the query, the database will add the row to table 130. In particular embodiments, update engine 215 generates a structured query language query. An example algorithm for update engine 215 is as follows: receive an indication from authorization engine 210 that the requesting user is authorized to perform the requested operation; generate an update request based on the requested operation; communicate the update request to the database to instruct the database to perform the requested operation.

Alert engine 220 generates and communicates alert 225 if the requesting user is not authorized to perform the requested operation. Alert 225 indicates that the user is not authorized to perform the requested operation. For example, if the requested operation is to add a row to table 130 and the user is not authorized to perform that operation, then alert 225 indicates that the user is not authorized to add a row to table 130. An example algorithm followed by alert engine 220 is as follows: wait for an indication from authorization engine 210 that a user is not authorized to perform a requested operation; receive the indication from authorization engine 210; in response to receiving the indication, generate alert 225; populate alert 225 with information indicating that the user is not authorized to perform the requested operation; communicate alert 225.

In particular embodiments, database service tool 125 includes a logging engine that maintains a log indicating requested operations. For example, the log may indicate the requested operations that were performed and the requested operations that were not performed. The log may also indicate the result of performing the operation, for example, whether the operation succeeded and/or failed. An example algorithm for the logging engine is as follows: receive an indication from user interface 200 that request 150 was received and the requested operation indicated by request 150; add an entry to a log indicating that request 150 was received and the requested operation; receive an indication whether a requesting user was authorized to perform the requested operation; add an entry to the log indicating whether the requested operation was authorized; receive an indication of the result of performing and/or not performing the requested operation; add an entry to the log indicating the result of performing and/or not performing the operation.

Database service tool 125 performs secondary security checks in some embodiments, During the secondary security checks, database service tool 125 analyzes authorization table 135 to determine whether there are additional users who should approve a requested operation. For example, authorization table 135 may indicate that a second user should approve all changes to a table. When a first user requests to add a row to the table, even if that first user is authorized to make changes to the table, database service tool 125 may still determine based on authorization table 135, that the second user should approve such a change before it is carried out. Database service tool 125 may then query the second user to see if the second user approves the addition of the row to the table. If the second user does not approve, then the original request is rejected. If the second user approves, then the row is added to the table.

In particular embodiments, by using database service tool 125 the security of the database is maintained. For example, database service tool 125 ensures that only users who are authorized to perform certain operations are allowed to perform those operations when requested. In this manner, certain users who may present a risk to the database are prevented from performing operations on the database.

FIG. 3 is a flowchart illustrating a method 300 for enforcing database security using the system 100 of FIG. 1. In particular embodiments, database service tool 125 performs method 300. By performing method 300, database service tool 125 improves and/or maintains the security of a database by ensuring that users who are not allowed to perform operations on the database are prevented from doing so.

Database service tool 125 begin by receiving a request from a user to add a row to a table in the database in step 305. Database service tool 125 retrieves an authorization table from the database in step 310. In step 315, database service tool 125 determines whether the user is authorized to edit the table. If the user is not authorized to edit the table, database service tool 125 communicates an alert indicating that the user is not authorized to edit the table. If the user is authorized to edit the table, database service tool 125 communicates an update request to add the row to the table in step 325.

Figure 4:
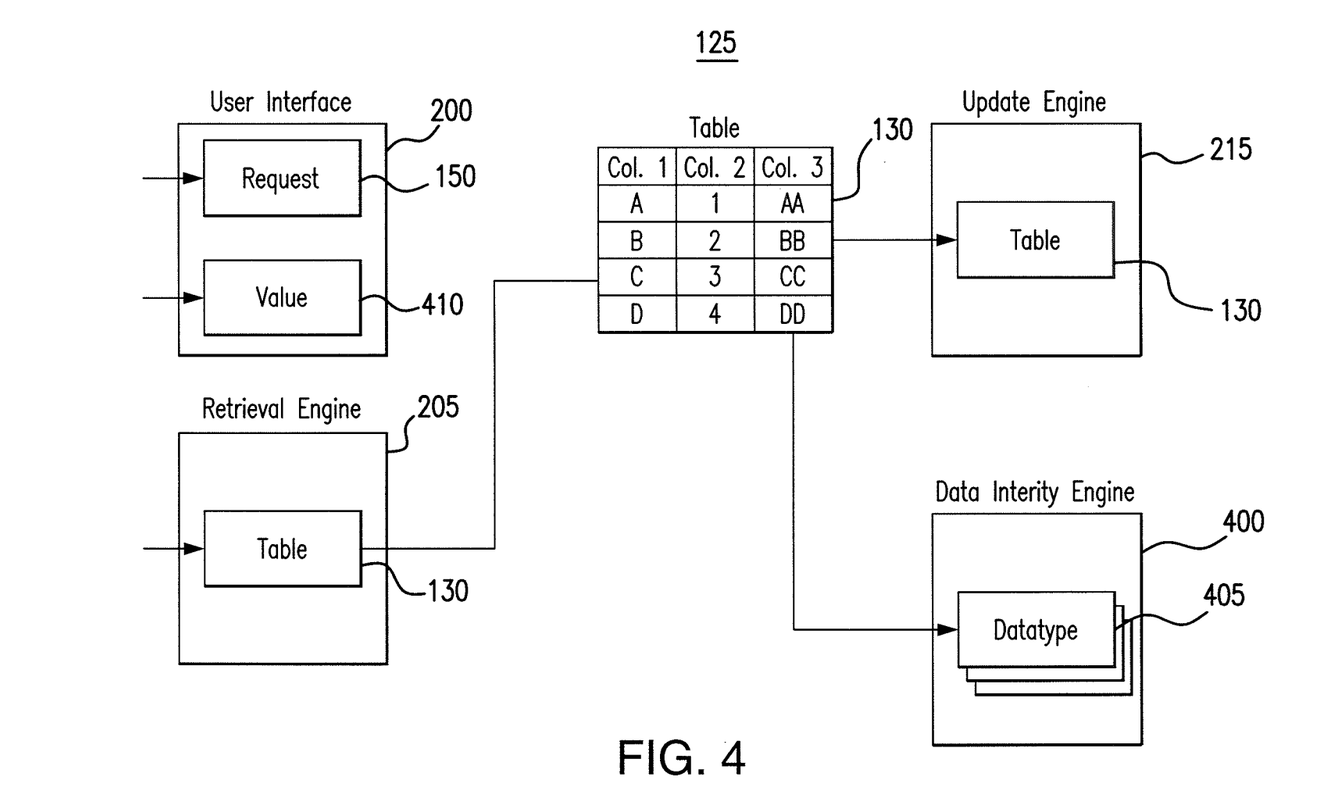
FIG. 4 illustrates the database service tool of the system of FIG. 1 checking data compliance.
Figure 5:
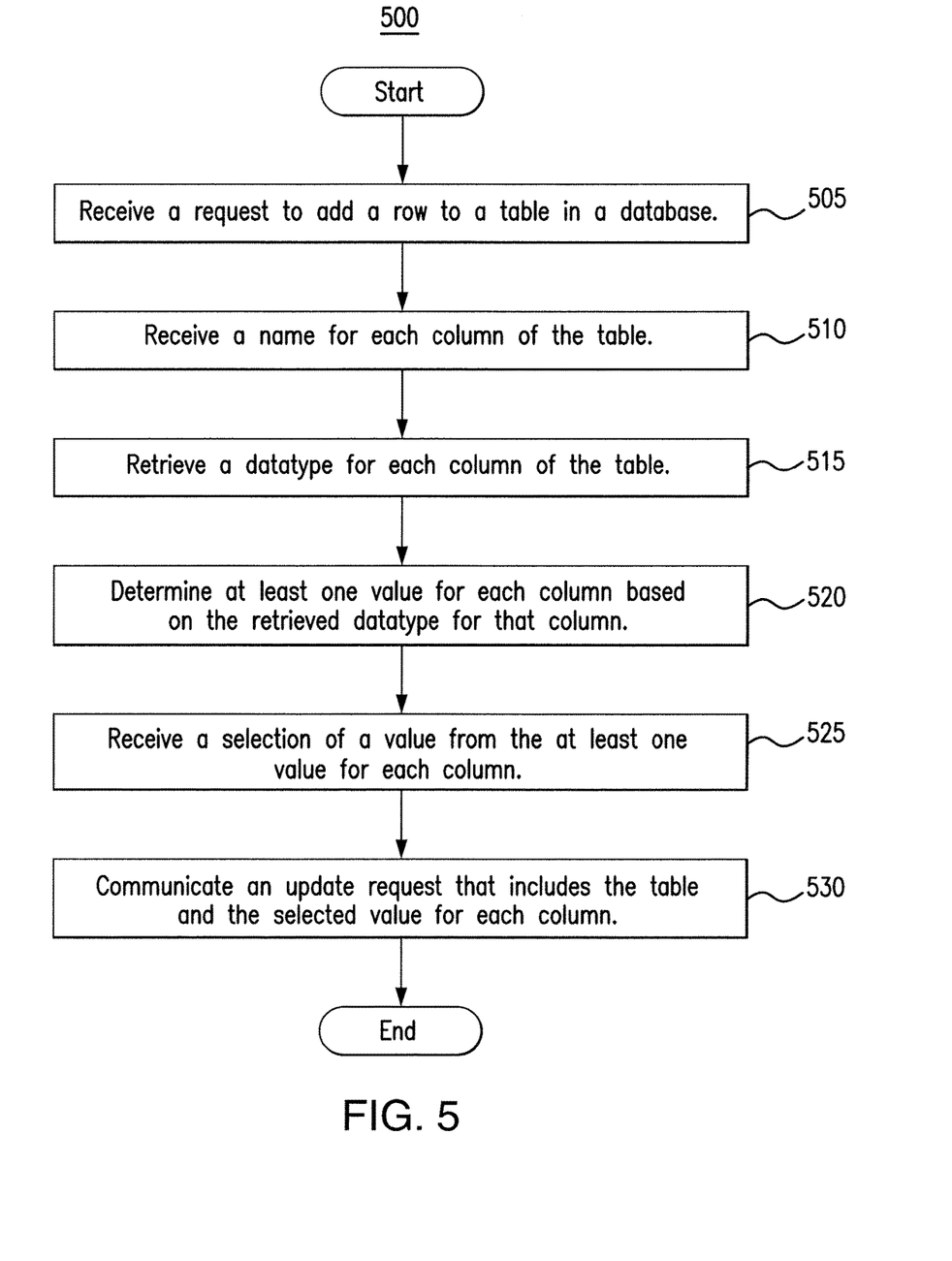
FIG. 5 is a flowchart illustrating a method for checking data compliance using the system of FIG. 1.

FIGS. 4 and 5 show database service tool 125 maintaining data compliance. Generally, database service tool 125 maintains data compliance by limiting values from which a user can select based on determined datatypes for each column of a table. In this manner, a user is prevented from adding data of an inappropriate datatype to the database.

FIG. 4 illustrates the database service tool 125 of the system 100 of FIG. 1 checking data compliance. As illustrated in FIG. 4, database service tool 125 includes user interface 200, retrieval engine 205, update engine 215, and a data integrity engine 400. Database service tool 125 may also be referred to as a database compliance tool. In particular embodiments, database service tool 125 improves and/or maintains the data compliance of a database by limiting value selections when operations are performed on the database.

User interface 200 receives information from a user. Similar to previously described embodiments, user interface 200 may be provided on a device of database service tool 125. Likewise, user interface 200 may be provided by database service tool 125 on a device 110 of system 100 such as, for example, a remote device. User interface 200 may receive a request 150 indicating an operation to be performed on a database. For example, request 150 may include a request to add a row to a table 130 of the database. Database service tool 125 may limit the values for the new row to ensure that data that is added to the database is compliant. An example algorithm for user interface 200 is as follows: wait for user input; receive request 150 from a user; and receive a value 410 from the user.

Retrieval engine 205 retrieves table 130 in response to user interface 200 receiving request 150. For example, if request 150 includes a request to add a row to table 130, retrieval engine 205 may retrieve table 130 from the database. An example algorithm for retrieval engine 205 is as follows: wait for an indication from user interface 200; receive an indication from user interface 200 that request 150 was received; open a connection to the database; and retrieve table 130 through the opened connection.

In the illustrated example of FIG. 4, table 130 includes three columns: column 1 stores letters, column 2 stores numbers and column 3 stores a string of characters. This disclosure contemplates table 130 including any number of columns storing any types of values. As shown in the example of FIG. 4, column 1 stores characters, column 2 stores numbers, and column 3 stores strings. As a result, if a row is to be added to table 130, then the row should include three columns. The first column should store a letter, the second column should store a number, and the third column should store a string of characters. Database service tool 125 may limit the types of values that a user can provide for the three columns of the row based on the datatypes of the columns in table 130. In this manner, database service tool 125 maintains data compliance of the database.

Data integrity engine 400 analyzes table 130 and determines one or more datatypes 405 for table 130. Each data type 405 may correspond to a data type of a particular column of table 130. In the illustrated example of FIG. 4, data types 405 may be a letter for column 1, a number for column 2, and a string of characters for column 3. Based on these determined data types, database service tool 125 may limit the values that a user can select from for the new row. An example algorithm for data integrity engine 400 is as follows: receive table 130; determine the columns of table 130; determine a datatype 405 for each column of table 130; and determine options for values for each column of table 130.

Database service tool 125 may present options from which the requesting user can select using user interface 200. For example, database service tool 125 may present the letters A through Z as potential values for column 1 of the new row. Likewise, database service tool 125 may present a box and instruct the user to input a number into that box for the value of column 2. Database service tool 125 may also present a text box and instruct the user to enter a string as the value for column 3. If the user enters a value that does not correspond with the datatype for that column, database service tool 125 may reject that selection. For example, if in column 2 the user enters a letter, database service tool 125 may reject that input. Similarly for column 1, because database service tool 125 limited the user's selection to letters A through Z, the user is forced to choose amongst the letters thereby guaranteeing that column 1 of the new row will contain a letter. When the user selects or inputs a value, user interface 200 may receive the value 410.

In particular embodiments, database service tool 125 may determine from the determined datatypes 405 that certain thresholds apply to the values of a column. For example, datatypes 405 may indicate that column 2 of table 130 should include only one digit numbers. As a result, database service tool 125 may limit the selection of values for column 2 to the digits 0 through 9. As a result, the user is limited in his selection of values for column 2. As another example, datatypes 405 may indicate that column 2 should include numbers less than 20. As a result, database service tool 125 may reject user input of a number greater than 20. In this manner, database service tool 125 maintains data compliance in the database.

Update engine 215 receives the selected values 410 and updates table 130 accordingly. For example, if the request is to add a new row to table 130 and the selected values 410 are the values for the columns of the new row, update engine 215 may update table 130 with the new row and the selected values. In particular embodiments, update engine 215 updates table 130 by adding the new row to the retrieved table 130 and then communicating the updated table to the database. In some embodiments, update engine 215 updates table 130 by generating and communicating an update request that includes the table (identifier for the table), the new row, and its selected values to the database. The update request may be a structured query language query to add the row to the table 130. In response to receiving the update request, the database will add the new row to table 130. An example algorithm for update engine 215 is as follows: receive selected values 410; generate an update request that indicates table 130 and the selected values 410; and communicate the update request to the database.

In particular embodiments, database service tool 125 includes a verification engine that further verifies the selected values 410. For example, the verification engine may verify that a selected value for column of table 130 includes a number of characters that is less than a character threshold such as, for example, one character. In the instance where the user inputs more than one character, the verification engine may reject that input. As another example, the verification engine may verify that a selected value 410 for column 2 of table 130 is less than a numerical threshold such as, for example, 20. In the instance where the user inputs a value that is greater than 20 the verification engine may reject that input. An example algorithm for the verification engine is as follows: receive the selected values 410; receive the one or more data types 405; determine any applicable thresholds; and apply the thresholds to the selected values 410.

The verification engine also checks to see if any circumstances have changed that may warrant a requested operation be canceled. For example, if a first user requests that a row be added to a table, but before that operation is carried out, a second user adds columns to the table, then the verification engine may ask the user whether the user still wants to operation to proceed. If the user wants the operation to proceed, then the verification engine may pass operation back to the data integrity engine to determine datatypes of the additional columns. If the user does not want the operation to proceed, then the verification engine can cancel the requested operation. As another example, if a user requests that all entries of a table be updated (e.g., deleted), but before that operation is carried out, the table is expanded to include additional rows and/or columns, then the verification engine can ask the user whether the user still wants the operation to proceed (because the operation will now update more entries that previously expected). If the user wants the operation to proceed, then the verification engine can proceed with the update. If not, then the verification engine can cancel the operation.

In some embodiments, database service tool 125 includes an alert engine that communicates an alert if the verification engine determines that selected values 410 are not compliant and/or if circumstances have changed that may warrant a requested operation be canceled. For example, if the verification engine determines that selected value 410 for column 1 includes too many characters or selected value 410 for column 2 includes a number greater than 20, then the alert engine generates and communicates the alert indicating that the data is not compliant. In some embodiments, update engine 215 generates and communicates a second update request to the database in response to the alert. In response to the second update request, the database removes the row that was added to table 130 because the row has been deemed non-compliant. An example algorithm for the alert engine is as follows: wait for an indication from the verification engine; receive an indication from the verification engine indicating that data is not compliant; and generate and communicate an alert indicating that the data is not compliant.

In particular embodiments, database service tool 125 improves and/or maintains data compliance of the database by limiting values that can be added to the database. In some embodiments, database service tool 125 further verifies any selected data against any applicable thresholds to maintain the data compliance of the database.

FIG. 5 is a flowchart illustrating a method 500 for checking data compliance using the system 100 of FIG. 1. In particular embodiments, database service tool 125 performs method 500. By performing method 500, database service tool 125 improves and/or maintains the data compliance of the database by limiting the values that a user can select from to add to the database.

Database service tool 125 may begin by receiving a request to add a row to a table in a database in step 505. In step 510, database service tool 125 retrieves a name for each column of the table. Database service tool 125 then retrieves a datatype for each column of the table in step 515. In step 520, database service tool 125 determines at least one value for each column based on the retrieved data type for that column. Then, in step 525, database service tool 125 receives a selection of a value from the at least one value. Database service tool 125 then communicates an update request that includes the table and the selected value for each column in step 530.

Figure 6:
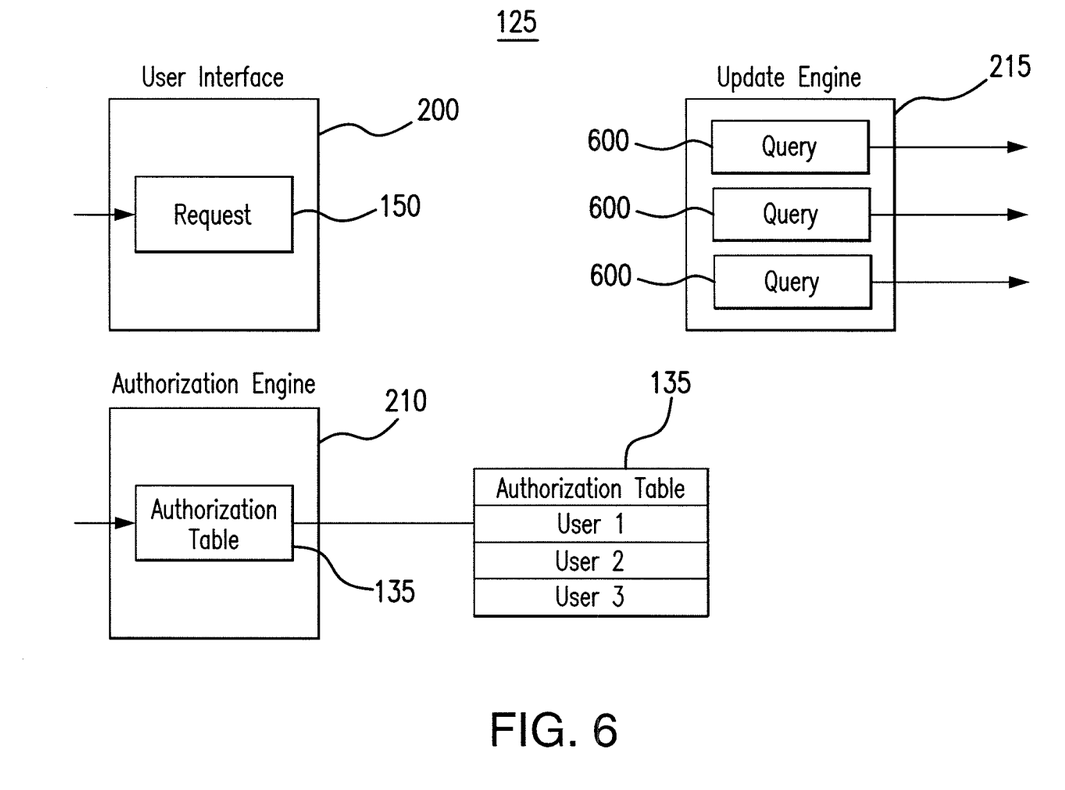
FIG. 6 illustrates the database service tool of the system of FIG. 1 performing a bulk load.
Figure 7:
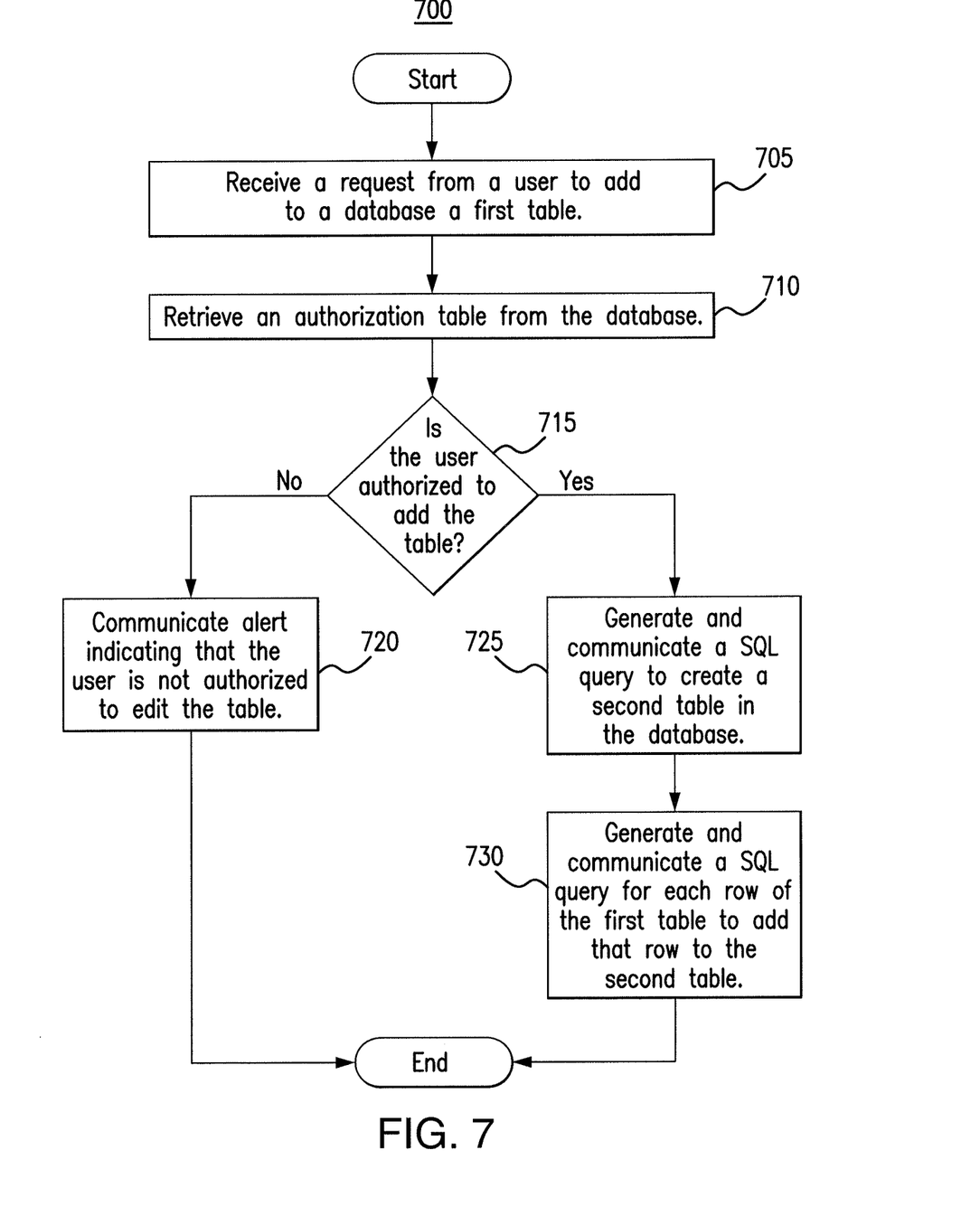
FIG. 7 is a flowchart illustrating a method for performing a bulk load using the system of FIG. 1.

FIGS. 6 and 7 show database service tool 125 performing a bulk operation. Generally, database service tool 125 performs bulk operations by automatically generating multiple queries to perform a bulk operation. In this manner, database service tool 125 prevents and/or reduces the number of mistakes that occur when generating the queries individually.

FIG. 6 illustrates the database service tool 125 of the system 100 of FIG. 1 performing a bulk load. As illustrated in FIG. 6, database service tool 125 includes user interface 200, authorization engine 210, and update engine 215. Database service tool 125 may also be referred to as a database load tool. In particular embodiments, by using database service tool 125, data compliance of a database may be maintained and/or improved because database service tool 125 automatically generates multiple queries for performing a bulk operation.

User interface 200 may receive information from a user. For example, user interface 200 may receive a request 150 from the user. Request 150 may indicate a bulk operation such as, for example, adding a table to a database and/or adding multiple rows to a table. This disclosure contemplates user interface 200 being provided by database service tool 125. For example, database service tool 125 may provide user interface 200 on a remote device. As another example, database service tool 125 may provide user interface 200 on a device of database service tool 125.

Existing processes for performing bulk operations on a database require a user to generate and communicate multiple queries to the database. Each query represents a request to perform an operation of the bulk operation. For example, if a user wanted to add a table to a database, the user would need to generate a query to create the table and then multiple queries to add the rows of the table to the database. If the size of the bulk operation is large, the user would have to generate many queries which is a process that is prone to error. Database service tool 125 addresses this process by automatically generating multiple queries 600 representing the bulk operation.

Authorization engine 210 receives authorization table 135. In particular embodiments, a retrieval engine may have retrieved authorization table 135 from the database. Authorization engine 210 analyzes authorization table 135 to determine whether a requesting user is authorized to perform operations on the database. For example, authorization engine 210 may determine whether the requesting user is listed in authorization table 135. If the user is authorized to perform the operation, then authorization engine 210 allows the operation to proceed. If the user is not authorized to perform the operation, then authorization engine 210 does not allow the operation to proceed.

If the operation is allowed to proceed, update engine 215 may analyze request 150 and generate multiple queries 600 representing the requested bulk operation. Update engine 215 may then communicate each of these queries 600 to the database. The database in response will perform the bulk operation. As an example, if request 150 indicates that a table is to be added to the database, update engine 215 may generate a first query 600 and communicate it to the database. The database may create a new table in response to receiving the first query 600. Then update engine may generate multiple queries 600 to add the rows of the table. Update engine 215 may communicate each of these multiple queries to the database. In particular embodiments, update engine 215 may communicate multiple queries 600 in one update request so that multiple rows are added to the table in response to the database receiving the update request. In response to receiving these queries, the database will add rows to the table. This disclosure contemplates a query 600 adding one or more rows to a table. As another example, if request 150 indicates that multiple rows should be added to an existing table in the database, update engine 215 may generate multiple queries 600 to add the rows to the table. Update engine 215 may communicate each of these multiple queries 600 to the database. In response, the database will add the new rows to the table. This disclosure contemplates query 600 being of any appropriate type such as, for example, a structured query language query.

In particular embodiments, database service tool 125 improves and/or maintains the data compliance of a database by automatically generating queries 600 for a bulk operation. By automatically generating these queries, database service tool 125 removes the burden from a user to generate each query individually. Furthermore, because the user does not have to generate the queries individually, the process of performing a bulk operation is less prone to error.

FIG. 7 is a flowchart illustrating a method 700 for performing a bulk load using the system 100 of FIG. 1. In particular embodiments, database service tool 125 performs method 700. By performing method 700, database service tool 125 improves and/or maintains the data compliance of a database.

Database service tool 125 begins by receiving a request from a user to add to a database a first table in step 705. In step 710, database service tool 125 retrieves an authorization table from the database. In step 715, database service tool 125 determines whether the user is authorized to add the table. If the user is not authorized to add the table, database service tool 125 communicates an alert indicating that the user is not authorized to add the table in step 720. If the user is authorized to add the table, database service tool 125 generates and communicates a SQL query to create a second table in the database in step 725. Then, database service tool 125 generates and communicates a SQL query for each row of the first table to add the row to the second table in step 730.

Modifications, additions, or omissions may be made to methods 300, 500, and 700 depicted in FIGS. 3, 5, and 7. Methods 300, 500, and 700 may include more, fewer, or other steps. For example, steps may be performed in parallel or in any suitable order. While discussed as database service tool 125 performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A database security tool comprising:
    a user interface configured to receive a request from a user to add a row to a table in a database;
    a retrieval engine configured to retrieve, in response to the request, an authorization table from the database, the authorization table separate from the table, the authorization table indicating a plurality of users who are authorized to edit the table;
    an authorization engine configured to determine whether the plurality of users includes the user;
    an alert engine configured to communicate an alert in response to a determination that the plurality of users does not include the user, the alert indicating that the user is not authorized to add the row to the table;
    an update engine configured to communicate, to the database, an update request in response to a determination that the plurality of users includes the user, wherein the row is added to the table in response to the update request;
    a data integrity engine configured to determine, for each column of the table, at least one value based on a retrieved datatype of the column, wherein the retrieval engine is further configured to retrieve the datatype for each column; and
    a logging engine configured to:
        receive an indication that the request was received;
        add an entry to a log indicating that the request was received;
        receive an indication that the plurality of users includes the user;
        add an entry to the log indicating that the addition of the row to the table was authorized;
        receive an indication that the row was added to the table; and
        add an entry to the log indicating that the row was added to the table.

2. The database security tool of claim 1, further comprising a verification engine configured to:
    verify that a value for a first column of the row comprises a number of characters that is less than a character threshold; and verify that a value for a second column of the row comprises a number that is less than a numerical threshold.

3. The database security tool of claim 2, wherein the alert engine is further configured to communicate a second alert if the verification engine determines at least one of that the number of characters exceeds the character threshold and that the number exceeds the numerical threshold, wherein:
the update engine is further configured to communicate, to the database, a second update request in response to the second alert; and
the row is removed in response to the second update request.

4. The database security tool of claim 1, wherein the update request is a Structured Query Language query.

5. The database security tool of claim 1, wherein a plurality of rows is added to the table in response to the update request.

6. A method comprising:
receiving a request from a user to add a row to a table in a database;
retrieving, in response to the request, an authorization table from the database, the authorization table separate from the table, the authorization table indicating a plurality of users who are authorized to edit the table;
determining whether the plurality of users includes the user;
communicating an alert in response to a determination that the plurality of users does not include the user, the alert indicating that the user is not authorized to add the row to the table;
communicating, to the database, an update request in response to a determination that the plurality of users includes the user, wherein the row is added to the table in response to the update request;
determining, for each column of the table, at least one value based on a retrieved datatype of the column;
retrieving the datatype for each column;
receiving an indication that the request was received;
adding an entry to a log indicating that the request was received;
receiving an indication that the plurality of users includes the user;
adding an entry to the log indicating that the addition of the row to the table was authorized;
receiving an indication that the row was added to the table; and
adding an entry to the log indicating that the row was added to the table.

7. The method of claim 6, further comprising:
verifying that a value for a first column of the row comprises a number of characters that is less than a character threshold; and
verifying that a value for a second column of the row comprises a number that is less than a numerical threshold.

8. The method of claim 7, further comprising:
communicating a second alert if the verification engine determines at least one of that the number of characters exceeds the character threshold and that the number exceeds the numerical threshold; and
communicating, to the database, a second update request in response to the second alert, wherein the row is removed in response to the second update request.

9. The method of claim 6, wherein the update request is a Structured Query Language query.

10. The method of claim 6, wherein a plurality of rows is added to the table in response to the update request.

11. A system comprising:
a retrieval engine configured to retrieve, in response to a received request to add a row to a table in a database, an authorization table from the database, the authorization table separate from the table, the authorization table indicating a plurality of users who are authorized to edit the table;
an authorization engine configured to determine whether the plurality of users includes the user;
an alert engine configured to communicate an alert in response to a determination that the plurality of users does not include the user, the alert indicating that the user is not authorized to add the row to the table;
an update engine configured to communicate, to the database, an update request in response to a determination that the plurality of users includes the user, wherein the row is added to the table in response to the update request;
a data integrity engine configured to determine, for each column of the table, at least one value based on a retrieved datatype of the column, wherein the retrieval engine is further configured to retrieve the datatype for each column; and
a logging engine configured to:
receive an indication that the request was received;
add an entry to a log indicating that the request was received;
receive an indication that the plurality of users includes the user;
add an entry to the log indicating that the addition of the row to the table was authorized;
receive an indication that the row was added to the table; and
add an entry to the log indicating that the row was added to the table.

12. The system of claim 11, further comprising a verification engine configured to:
verify that a value for a first column of the row comprises a number of characters that is less than a character threshold; and
verify that a value for a second column of the row comprises a number that is less than a numerical threshold.

13. The system of claim 12, wherein the alert engine is further configured to communicate a second alert if the verification engine determines at least one of that the number of characters exceeds the character threshold and that the number exceeds the numerical threshold, wherein:
the update engine is further configured to communicate, to the database, a second update request in response to the second alert; and
the row is removed in response to the second update request.

14. The system of claim 11, wherein the update request is a Structured Query Language query.

15. The system of claim 11, wherein a plurality of rows is added to the table in response to the update request.

* * * * *